(12) United States Patent
Itoh et al.

(10) Patent No.: US 7,154,557 B2
(45) Date of Patent: Dec. 26, 2006

(54) JOINT PRE-/POST-PROCESSING APPROACH FOR CHROMINANCE MIS-ALIGNMENT

(75) Inventors: Yuji Itoh, Ibaraki (JP); Ngai-Man Cheung, Los Angeles, CA (US)

(73) Assignee: Texas Instruments Incorporated, Dallas, TX (US)

( * ) Notice: Subject to any disclaimer, the term of this patent is extended or adjusted under 35 U.S.C. 154(b) by 711 days.

(21) Appl. No.: 10/364,095

(22) Filed: Feb. 11, 2003

(65) Prior Publication Data
US 2004/0155980 A1    Aug. 12, 2004

(51) Int. Cl.
    *H04N 11/02*    (2006.01)
(52) U.S. Cl. .................. 348/453; 348/450; 348/441; 348/631
(58) Field of Classification Search ............. 348/453, 348/582, 624, 631, 712–713, 234, 241–242, 348/222.1; 382/166–167, 299, 251–261; *H04N 11/02*
    See application file for complete search history.

(56) References Cited

U.S. PATENT DOCUMENTS

| 5,341,442 | A | * | 8/1994 | Barrett ...................... 382/166 |
| 5,712,687 | A | * | 1/1998 | Naveen et al. .............. 348/453 |
| 6,583,824 | B1 | * | 6/2003 | Cacciatore et al. ......... 348/649 |
| 6,788,347 | B1 | * | 9/2004 | Kim et al. .................. 348/441 |
| 7,002,627 | B1 | * | 2/2006 | Raffy et al. ................. 348/273 |

* cited by examiner

*Primary Examiner*—Trang U. Tran
(74) *Attorney, Agent, or Firm*—Robert D. Marshall, Jr.; W. James Brady; Frederick J. Telecky, Jr.

(57) ABSTRACT

This invention corrects chrominance misalignment that occurs during chrominance down-sampling and up-sampling. The invention extracts a binary index from the corresponding luminance signal. The binary index enables generation of a filter window. On down-sampling the filter window is applied to a block of source chrominance pixels which are filtered or not based upon the binary index. On up-sampling the binary index of the filter window for the target chrominance pixels determines which are filtered or not.

16 Claims, 9 Drawing Sheets

LUMINANCE ORIGINAL
(τ=94)

| 132 (1) | 134 (1) | 132 (1) | 123 (1) | 116 (1) | 72 (0) | 62 (0) | 55 (0) |
|---|---|---|---|---|---|---|---|
| 130 (1) | 130 (1) | 131 (1) | 118 (1) | 104 (1) | 61 (0) | 55 (0) | 51 (0) |
| 131 (1) | 132 (1) | 127 (1) | 117 (1) | 76 (0) | 54 (0) | 57 (0) | 58 (0) |
| 137 (1) | 139 (1) | 123 (1) | 105 (1) | 63 (0) | 55 (0) | 55 (0) | 55 (0) |
| 132 (1) | 128 (1) | 122 (1) | 82 (0) | 56 (0) | 55 (0) | 63 (0) | 54 (0) |
| 128 (1) | 127 (1) | 112 (1) | 68 (0) | 60 (0) | 54 (0) | 55 (0) | 53 (0) |
| 126 (1) | 125 (1) | 82 (0) | 60 (0) | 51 (0) | 54 (0) | 55 (0) | 56 (0) |
| 127 (1) | 120 (1) | 67 (0) | 52 (0) | 51 (0) | 56 (0) | 53 (0) | 55 (0) |

801, 802, 803

CHROMINANCE (Cb)
ORIGINAL (τ=126)

| 114 (0) | 113 (0) | 113 (0) | 113 (0) | 119 (0) | 127 (1) | 139 (1) | 136 (1) |
|---|---|---|---|---|---|---|---|
| 114 (0) | 114 (0) | 112 (0) | 119 (0) | 115 (0) | 135 (1) | 138 (1) | 138 (1) |
| 113 (0) | 115 (0) | 114 (0) | 120 (0) | 126 (1) | 137 (1) | 137 (1) | 135 (1) |
| 117 (0) | 113 (0) | 119 (0) | 120 (0) | 133 (1) | 139 (1) | 137 (1) | 139 (1) |
| 113 (0) | 116 (1) | 120 (0) | 126 (1) | 136 (1) | 138 (1) | 136 (1) | 137 (1) |
| 117 (0) | 115 (0) | 123 (0) | 133 (1) | 138 (1) | 137 (1) | 136 (1) | 138 (1) |
| 117 (0) | 120 (0) | 126 (1) | 135 (1) | 138 (1) | 138 (1) | 136 (1) | 137 (1) |
| 116 (0) | 117 (0) | 133 (1) | 138 (1) | 137 (1) | 138 (1) | 136 (1) | 135 (1) |

| 114 (1) | 114 (1) | 114 (1) | 114 (1) | 117 (1) | 138 (0) | 138 (0) | 138 (0) |
|---|---|---|---|---|---|---|---|
| 114 (1) | 114 (1) | 114 (1) | 114 (1) | 117 (1) | 136 (0) | 138 (0) | 138 (0) |
| 115 (1) | 115 (1) | 118 (1) | 118 (1) | 134 (0) | 134 (0) | 137 (0) | 137 (0) |
| 115 (1) | 115 (1) | 118 (1) | 118 (1) | 134 (0) | 134 (0) | 137 (0) | 137 (0) |
| 115 (1) | 115 (1) | 122 (1) | 135 (0) | 137 (0) | 137 (0) | 137 (0) | 137 (0) |
| 115 (1) | 115 (1) | 122 (1) | 135 (0) | 137 (0) | 137 (0) | 137 (0) | 137 (0) |
| 118 (1) | 118 (1) | 133 (0) | 133 (0) | 138 (0) | 138 (0) | 136 (0) | 136 (0) |
| 118 (1) | 118 (1) | 133 (0) | 133 (0) | 138 (0) | 138 (0) | 136 (0) | 136 (0) |

*FIG. 14*

| 114 | 114 | <u>124</u> | 138 |
|---|---|---|---|
| 115 | 118 | 134 | 137 |
| 115 | <u>126</u> | 137 | 137 |
| 118 | 133 | 138 | 136 |

*FIG. 15*

JOINT PRE-/POST-PROCESSING APPROACH FOR CHROMINANCE MIS-ALIGNMENT

BACKGROUND OF THE INVENTION

Figure 1:
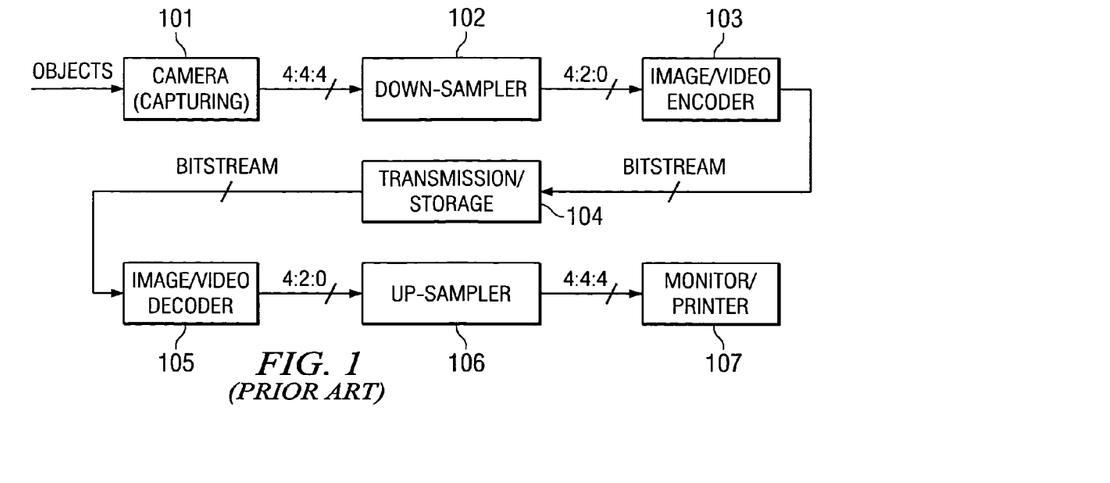
FIG. 1 illustrates a block diagram of an image-video coding system according to the prior art.

FIG. 1 illustrates in block diagram form an image/video coding system. The data format at each process is shown in FIG. 1. Camera 101 captures an image of the objects within its view. This image is transmitted to down-sampler 102 in the 4:4:4 format. Down-sampler 102 transforms each image into the 4:2:0 format. Image/video encoder 103 encodes the image data into a form for transmission or storage. This typically includes some form of data compression. The resulting bitstream is transmitted and/or stored (transmission/storage 104). Ultimately this bitstream supplies image/video decoder 105. Image/video decoder 105 decodes the image data and recovers the images in the 4:2:0 format. Up-sampler 106 converts this 4:2:0 format image data into 4:4:4 format image data. Thus down-sampler 102 is placed between camera 101 and image/video encoder 103 at transmitter side. Up-sampler 106 is after image/video decoder 105 constructs the image. Note that both 4:4:4 and 4:2:0 represent the image formats of YCbCr color space. Generally, the 4:4:4 format image has more information than the 4:2:0 and thus requires a larger data rate.

Figure 2:
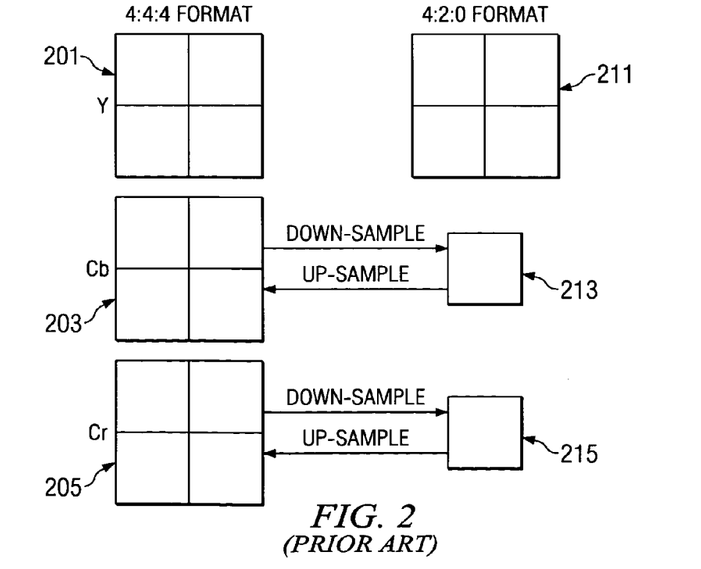
FIG. 2 illustrates a comparison of the spatial resolution of the 4:4:4 and 4:2:0 formats according to the prior art.

FIG. 2 illustrates a comparison of the spatial resolution of the 4:4:4 and 4:2:0 formats. The Y component is called luminance (or luma), while Cb and Cr components are the chrominance (or chroma). Chrominance components Cb and Cr are related to respective blue and red color planes. Each 2-by-2 luminance block 201 in the 4:4:4 format is the same as the corresponding 2-by-2 block 211 in the 4:2:0 format. On down sampling a 2-by-2 block 203 of chrominance component Cb becomes a single block 213 of data. This conversion typically averages the data of the four pixels of 2-by-2 block 203. Alternatively, this conversion could be a filter function of the four pixels with corresponding filter coefficients. This is known as down-sampled with a ratio of 4:1, or more precisely, 2-by-2 to 1. On up sampling, a single block 213 becomes a 2-by-2 block 203. Typically the data of the single block 213 is copied to each of the four blocks of 2-by-2 block 230. Chrominance component Cr has a similar 2-by-2 block 205 in the 4:4:4 format and a corresponding single block 215 in the 4:2:0 format.

Figure 3:
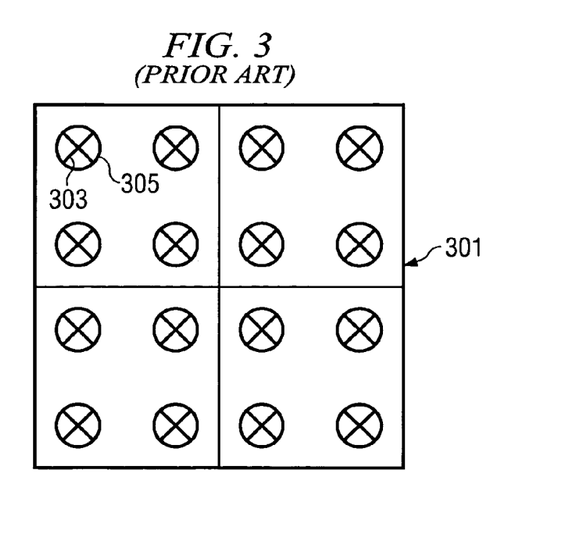
FIG. 3 illustrates the positions of luminance and chrominance pixels according to the 4:4:4 format of the prior art.

FIG. 3 illustrates the position of luminance and chrominance pixels in the 4:4:4 format. In FIG. 3, X represents the position of a luminance pixel and O represents the position of a chrominance pixel. Each 2-by-2 block 301 includes 4 luminance pixels 303 and four each of chrominance Cb and chrominance Cr pixels 305. As shown in FIG. 3 the luminance pixels 303 are coincident with chrominance pixels 305.

Figure 4:
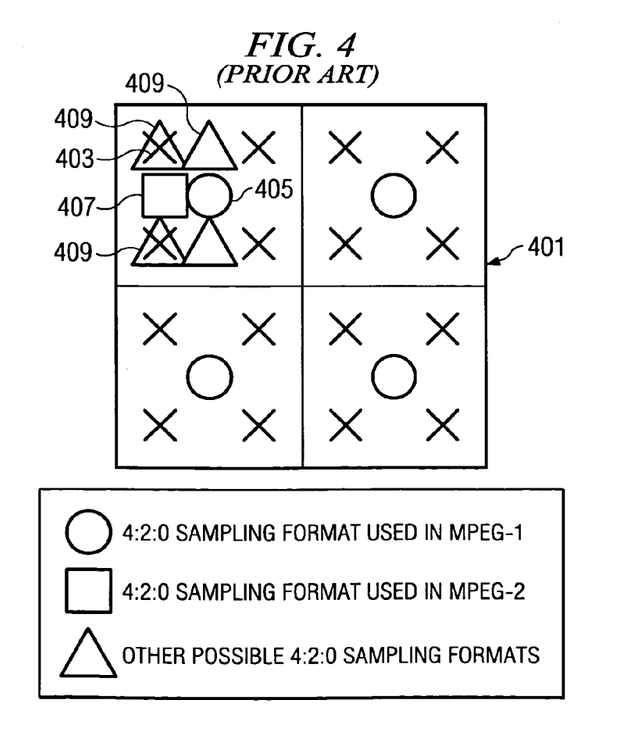
FIG. 4 illustrates the positions of luminance and chrominance pixels according to the 4:2:0 format of the prior art.

FIG. 4 illustrates the position of luminance and chrominance pixels in the 4:2:0 format. Each 2-by-2 block 401 includes 4 luminance pixels 403 and one each of chrominance Cb pixel and chrominance Cr pixel. Luminance pixels 403 are disposed in the same pattern as luminance pixels 303 illustrated in FIG. 3. The two chrominance pixels can be disposed in more than one location. Chrominance pixels 405 (circles) are disposed between the four luminance pixels 403 and centered in the 2-by-2 block 401. This sampling pattern is used in MPEG-1. Alternatively, chrominance pixels 407 (squares) are disposed on the center left of block 401. This sampling pattern is used in MPEG-2. Other possible chrominance pixel locations are illustrated at 409 (triangles).

Figure 5:
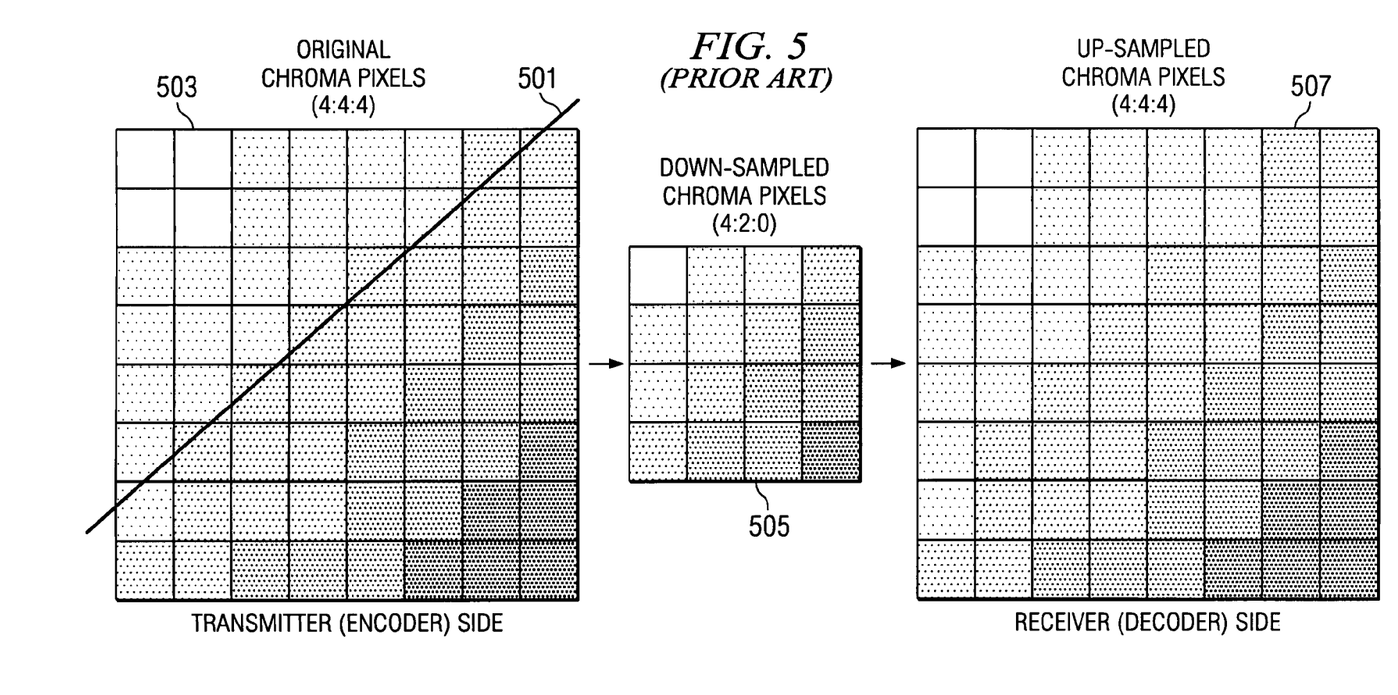
FIG. 5 illustrates an example down sample to up sample transition of chrominance pixels in the prior art.

FIG. 5 illustrates how the chrominance signals change in a conventional system during the image/video coding. The example of FIG. 5 employs an 8-by-8 block. Such an 8-by-8 block is widely used in image/video coding algorithms relevant to this invention. This does not jeopardize a generality of the discussion, one may use any other unit.

FIG. 5 includes line 501 over the original 8-by-8 chrominance block 503. Line 501 marks an edge (i.e., steep transition in gray levels) along the line. The 4:4:4 format data of 8-by-8 chrominance block 503 is down sampled to a 4-by-4 chrominance block 505 in the 4:2:0 format. Eight-by-8 chrominance block 507 represents an up sampling back to the 4:4:4 format from 4-by-4 chrominance block 505. A corresponding edge can not be observed in the up-sampled 8-by-8 chrominance block 507. This quality degradation is visible in non-stationary areas such as edges and fine textures. Details are lost through the down-sampling and up-sampling processes. The receiver wants to see an image as close to the original as possible. Receiver quality is one of the most important criteria when people develop an image/video coding system. Thus the lost information of the edge in the example of FIG. 5 should be restored. This application refers to this problem as the "chrominance mis-alignment" problem. This invention is a proposed technique to re-align these mis-aligned signals. The solution of this invention is described below.

SUMMARY OF THE INVENTION

This invention corrects chrominance misalignment that occurs during chrominance down-sampling and up-sampling. The invention extracts a binary index from the corresponding luminance signal. The binary index enables generation of a filter window. On down-sampling the filter window is applied to a block of source chrominance pixels which are filtered or not based upon the binary index. On up-sampling the binary index of the filter window for the target chrominance pixels determines which are filtered or not.

In the preferred embodiment homogenous and heterogenous binary index blocks are handled differently. Homogenous blocks have all the same binary index while heterogenous blocks include both digital values. On down sampling, the method averages all pixels for homogenous blocks and averages pixels having the binary index of a predetermined pixel for heterogenous blocks. On up sampling, homogenous blocks are filled with the source pixel value. For heterogenous blocks, the source pixel is put in a predetermined pixel and all with the same index value. Pixels with the opposite index value are filled with the average of the surrounding pixels having this opposite index value. This process can be viewed as employing a filter function with differing filter coefficients depending on the value of the corresponding binary index.

BRIEF DESCRIPTION OF THE DRAWINGS

These and other aspects of this invention are illustrated in the drawings, in which.

DETAILED DESCRIPTION OF PREFERRED EMBODIMENTS

Figure 6:
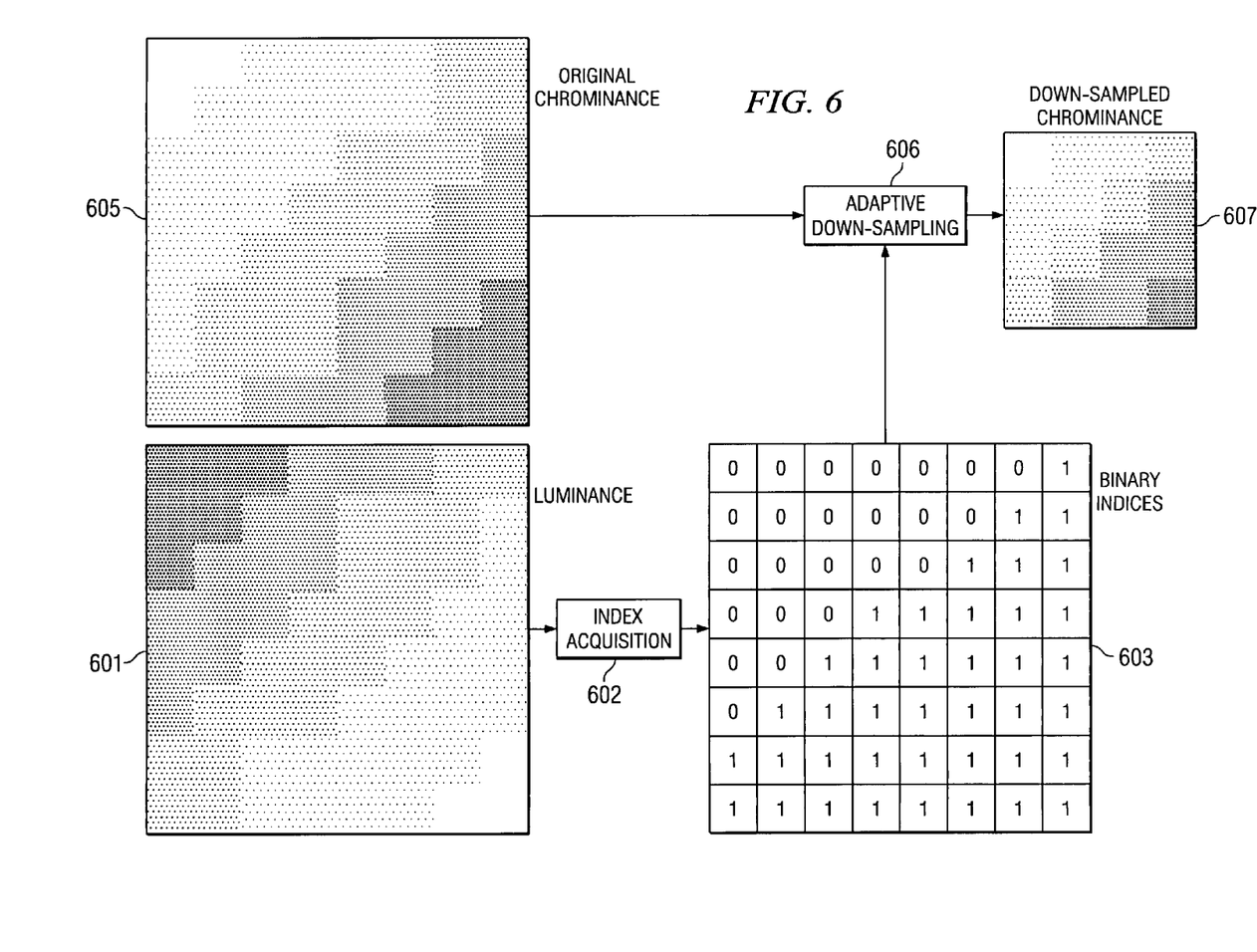
FIG. 6 illustrates a pre-processing down-sampling algorithm, including index acquisition and adaptive down-sampling according to this invention.
Figure 7:
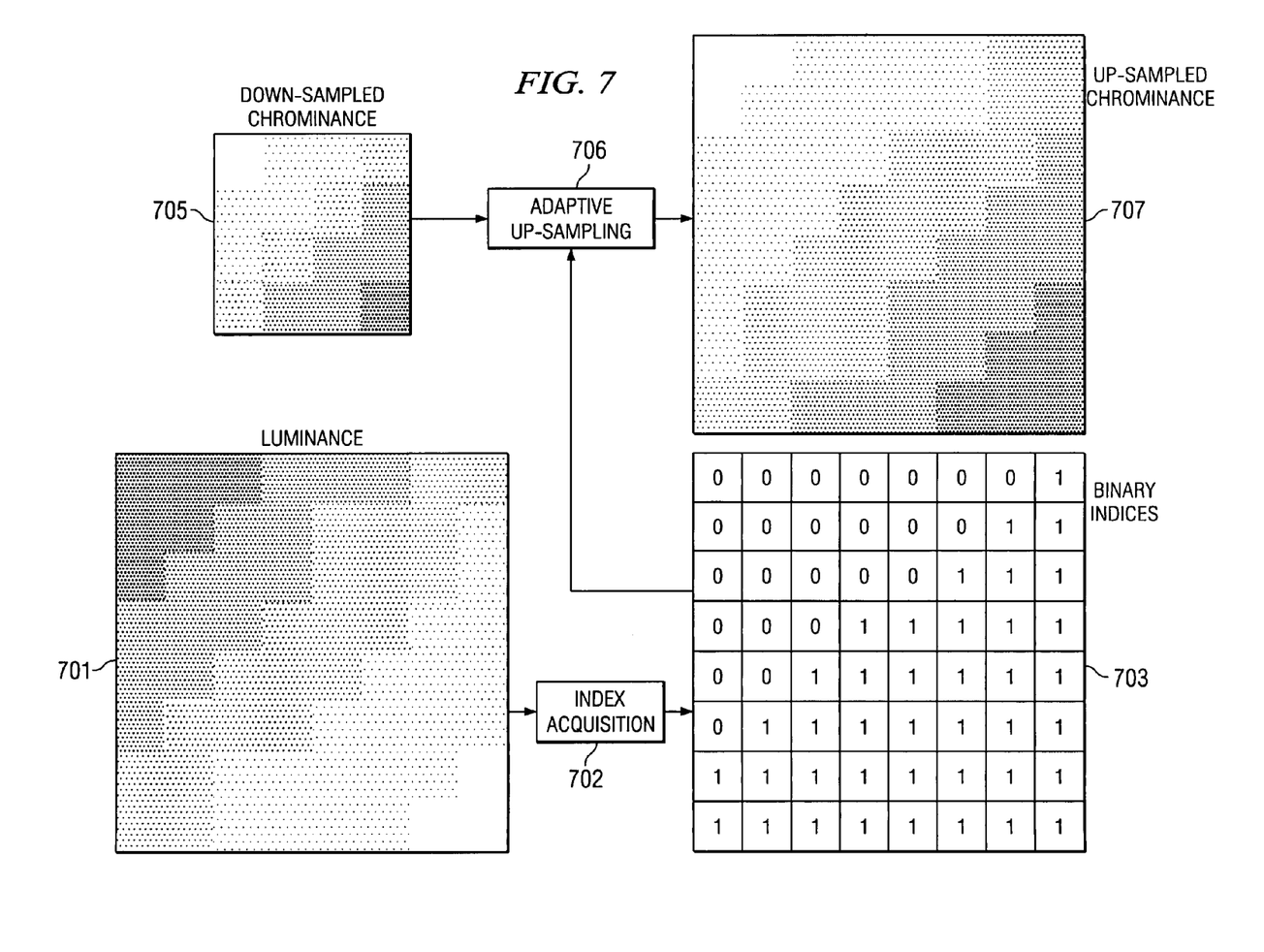
FIG. 7 illustrates a post-processing up-sampling algorithm, including index acquisition and adaptive up-sampling according to this invention.

This invention is a solution to the chrominance misalignment problem employing a joint pre-/post-processing approach. FIGS. 6 and 7 illustrate a schematic example of this invention at the block level. FIG. 6 illustrates an example where an 8-by-8 chrominance block 605 is down-sampled to a 4-by-4 block 607 upon encoding. The luminance block 601 is processed by index acquisition block 602 to generate binary indices block 603. Adaptive down-sampling block 606 receives the chrominance block 605 and binary indices block 603 and produces the down-sampled chrominance block 607. FIG. 7 illustrates an example where 4-by-4 chrominance block 705 is up-sampled to 8-by-8 block 707 upon decoding. The luminance block 701 is processed by index acquisition block 702 to generate binary indices block 703. Adaptive up-sampling block 706 receives the chrominance block 705 and binary indices block 703 and produces the up-sampled chrominance block 707.

As shown in FIGS. 6 and 7, this invention is an adaptive down-sampling and up-sampling based on a binary index. This invention performs the index acquisition on a certain window larger than filter masks of down-sampling and up-sampling. In a typical implementation, the index acquisition is applied once per processing unit. This is an block in the example of FIGS. 6 and 7. The filter masks for down-sampling and up-sampling are usually 3-by-3 or 5-by-5. Firstly, a single threshold value per 8-by-8 block is formed by index acquisition block 602 or 702. Using this threshold, pixels in the processing unit are classified into two kinds of populations. There are several candidates for the threshold value: average, median, mode or middle of dynamic range. The preferred threshold is the middle of the dynamic range. This threshold is preferred because it better discriminates between the populations than the alternatives. Let max and min be the respective maximum and minimum values in a block. The threshold τ is defined as:

$$\tau = (\max + \min)/2 \qquad (1)$$

The binary index λ(i) depends on whether the luminance pixel value x(i) is greater than the threshold or not.

$$\lambda(i) = \begin{cases} 1 & \text{if } x(i) \geq \tau \\ 0 & \text{otherwise} \end{cases} \qquad (2)$$

The binary indices λ(i) provide local structure information that can be exploited to help restore the lost information, such as details of the chrominance signals, through the coding process.

Figure 8:
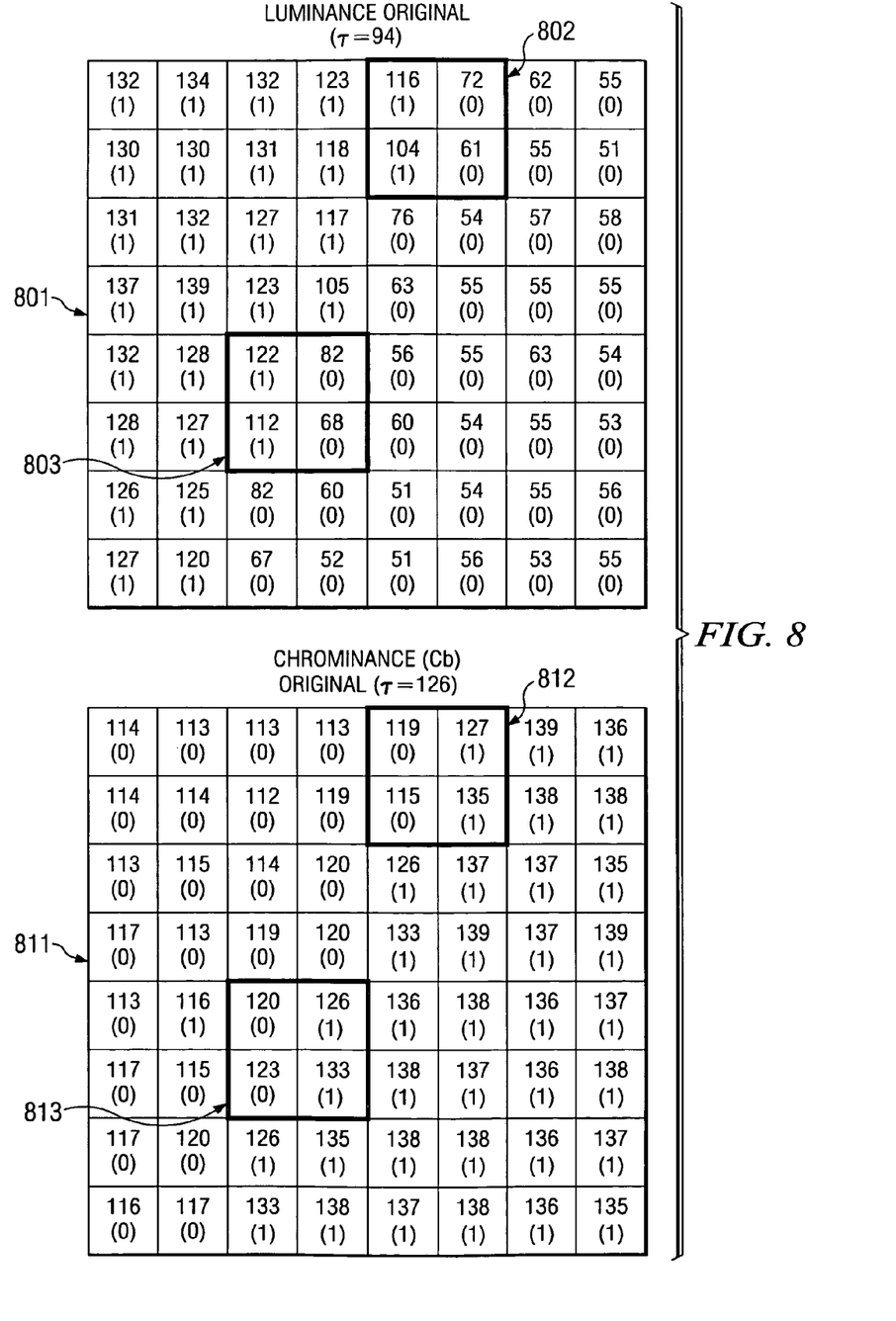
FIG. 8 illustrates exemplary luminance and chrominance Cb pixel values and binary indices highlighting 2-by-2 blocks with heterogeneous index values.

The following description employs an example taken from a region of a picture of a face having a border between a cheek and hair. FIG. 8 illustrates pixel values and binary indices at that border. Luminance pixel values 801 have a threshold value τ of 94. Chrominance Cb values 811 have a threshold value τ of 126. The pixel values in parenthesis are the binary indices.

FIG. 8 indicates that the luminance and chrominance components are coherent in the binary index. In this particular example block that the binary index of the chrominance is the inverse of the binary index of the luminance. This result is consistent with the intuition that the local structure may be shared between color planes. For example, an edge location in luminance coincides with the same edge in chrominance plane. This is called the inter-chrominance coherence property. Perfect coherence of a 100% match between the binary index of the luminance and the binary index of the chrominance will not always be obtained. An inter-chrominance of 80% or more can generally be expected. However, these inter-chrominance levels may not what is important. The original 4:4:4 format image might not be correct. Intuitively, the color planes in original 4:4:4 format image should be aligned with each other. It is theoretically impossible to capture three planes at the same instance and from the same angle. Therefore the luminance signals can not be perfectly aligned with the chrominance signals. Such mis-alignment between the color planes occurs due to limited precision in the image capture. This implies that the mis-alignment should be corrected before applying down-sampling process. Correction of this quality of captured image is beyond the scope of this invention.

The following example uses a 4-to-1 pixel chrominance down-sampling, where 2-by-2 pixel blocks in 4:4:4 format are decimated to a single pixel in 4:2:0 format to illustrate both linear filtering of the prior art and this invention. Note that the technique of this invention is not limited to this example but could be used with other formats. There are several strategies for down-conversion. These are classified in terms of how to determine which index represents the 2-by-2 pixel region. The first strategy uses a majority basis. The second strategy uses a position basis. In the majority basis, a representative index dominates the region regarding the number of indices with a decision rule in case of a fifty-fifty population. In the positional basis for example, the top-left pixel would represent the region. Once the representative index is chosen, a pixel value must be derived that best describes the index and hence the region. All the pixels that have the representative index may be considered, such as calculating the mean value of the pixels, applying a filter to the pixels with the filter coefficients dependent upon the corresponding binary index or a particular pixel value may be chosen to represent the region in other cases. This application will describe an example in which the representative index is the top-left pixel and an example where the pixel value is the mean value of all pixels that have the representative index. Note this mean is equivalent to a filter having a 1 filter coefficient for pixels matching the representative index and a 0 filter coefficient for non-matching pixels.

In the example of FIG. 8 sixteen 2-by-2 regions in the original chrominance plane 811 will be down-converted to 4-by-4 samples. Among those 2-by-2 regions, only two regions 812 and 813 have heterogeneous indices. The other regions are all homogeneous because all four pixels have the same binary index. For these blocks there will be no difference in eventual output between the invention and a conventional linear method described below. Therefore, this application will only describe processes concerning the two heterogeneous regions 812 and 813. Note that luminance pixel block 801 has similar heterogeneous index blocks 802 and 803 because of the high inter-chrominance coherence in this example.

Figure 9:
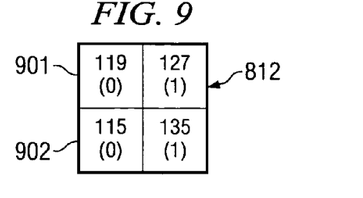
FIG. 9 illustrates one heterogeneous index region from FIG. 8.
Figure 10:
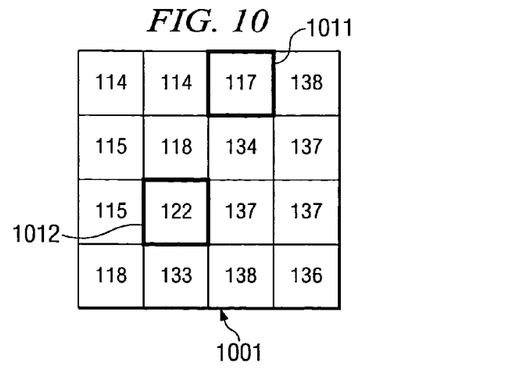
FIG. 10 illustrates exemplary subsampled chrominance values of the example of FIG. 8 with values representing heterogeneous regions highlighted.

Consider heterogeneous region 812 in the top 2-by-2 row illustrated in FIG. 9. Based on the position strategy described above, the representative index is '0' because this is the index of the top-left pixel 901. The down-sampled pixel value is 117. This is the mean of top-left pixel 901 and bottom-left pixel 902, selected because these pixels have the representative binary index value. Thus the down-sampled pixel has the chrominance Cb value of 117=(119+115+1)/2. FIG. 10 illustrates the chrominance values for the whole down-sampled block 1001. Pixels 1011 and 1012 correspond to the respective heterogeneous blocks 812 and 813.

Suppose a decoder received the bitstream containing chrominance signals shown in FIG. 10 and reconstructed those signals. As explained earlier, some significant edge information is lost compared to the original signals. This invention tries to restore the lost information using data available at the decoder. In homogeneous regions where all the pixels have the same index, the selection of the interpolation scheme does not seriously affect the output quality. Any interpolation, extrapolation or even pixel replication will work well on such highly correlated areas. In some detail regions, such as object boundaries and texture, the interpolation function has to be carefully chosen so as to avoid the artifacts such as edge blurring. This invention involves on an up-sampling technique scheme processing such detail regions rather than flat regions.

This invention uses an inter-component approach. This assumes significant correlation between the binary indexes of the luminance and the chrominance components. This assumption is justified by the fact that the luminance and chrominance components represent the same entity or object in the original image. So the luminance can help interpolate the corresponding chrominance samples in the up-sampling process.

Figure 11:
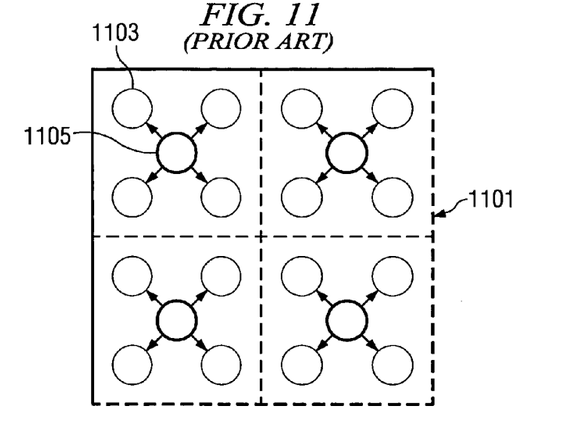
FIG. 11 illustrates a sample-hold technique in which a chrominance sample in 4:2:0 format is copied to surrounding four pixels forming a 4:4:4 format according to the prior art.

FIG. 11 illustrates a sample-hold technique of the prior art for converting a 4:2:0 format image into the 4:4:4 format. For each 2-by-2 block 1101, each chrominance pixel 1105 is copied into the pixel locations of the four luminance pixels 1103. Note that this process is used for both the chrominance components Cb and Cr. This invention applies this sample-hold technique at the initial stage of the processing.

Assume the binary index information of the reconstructed (i.e., decoded) luminance perfectly matches the binary indices of the two the original luminance planes. This match is always guaranteed when a lossless compress is employed. Even if a lossy or non-reversible compress is used, the binary index information is mostly retained at a practical quality level, such as a 10:1 compression ratio by JPEG and a 30:1 compression ratio by MPEG. This invention first applies the sample-hold technique illustrated in FIG. 11 to the decimated chrominance samples. Note the up-sampling process shall be consistent with the prior down-sampling process. For this example, value of top-left pixel will be copied to pixels that have the same index as the top-left pixel in a heterogeneous block, whereas all pixels share the same value in a homogeneous block.

Figure 12:
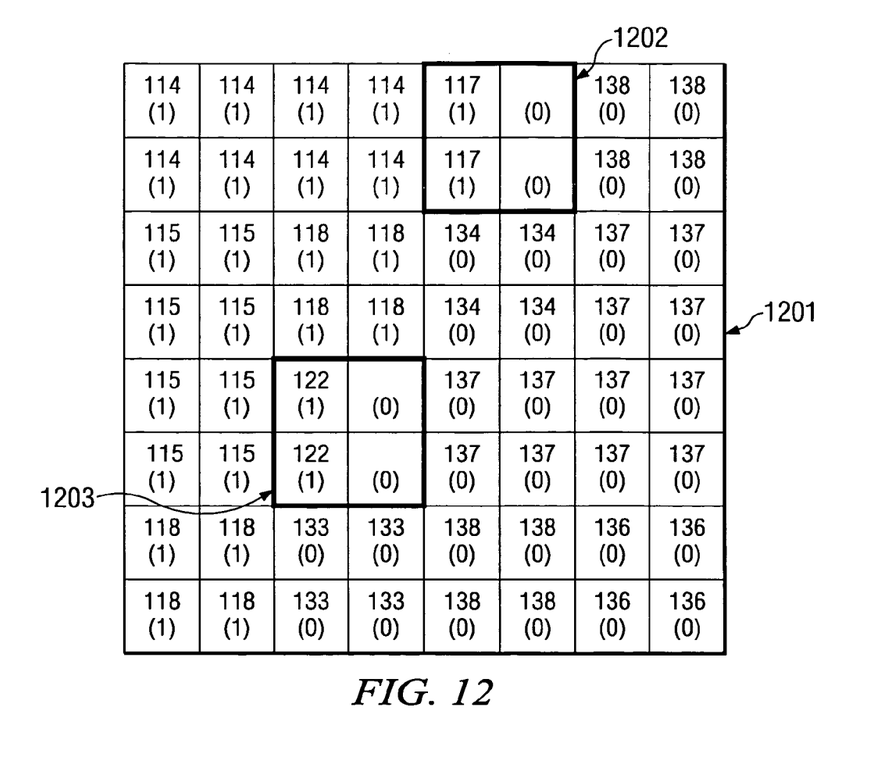
FIG. 12 illustrates interim chrominance values after a sample-hold process.

FIG. 12 illustrates 8-by-8 block 1201 the results of partial reconstruction of the chrominance data of FIG. 10 into the 4:4:4: format. This partial reconstruction assumes the same binary indices from the decoded luminance as the original luminance illustrated in FIG. 8. Each of the pixels of FIG. 10 with homogeneous binary indices from the decoded luminance is replicated into each of the four pixels of a 2-by-2 block. For heterogeneous block 1202 the chrominance value 117 from FIG. 10 is put into the top-left pixel and all other pixels having the same binary index as the top-left pixel. In this example, this includes only the bottom-left pixel. The other pixels have no assigned value at this stage. A similar process occurs for heterogeneous block 1203 with assignment of the value 122 from pixel 1012 of FIG. 10 to the top-left and bottom-left pixels.

Let $Y_{down}$ and $y_{up}$ be the input and output of the up-sampling scheme, respectively. The inter-chrominance up-sampling algorithm can be represented by:

$$y_{up}(k) = f(Y_{down}, \Lambda)$$

$$Y = \{y_{down}(0), y_{down}(1), \ldots y_{down}(n-1)\} \quad (3)$$

$$\Lambda = \{\lambda(0), \lambda(1), \ldots, \lambda(n-1)\}$$

$$0 \leq k \leq n-1$$

where: n represents the number of input samples needed to derive an output. The value n depends on the filter mask employed. By defining an appropriate filter mask or window, the above equation becomes:

$$y_{up}(k) = \frac{\sum_{i=0}^{n-1} y_{down}(i) \cdot \theta(i) \cdot coef(i)}{\sum_{i=0}^{n-1} \theta(i) \cdot coef(i)} \quad (4)$$

$$\theta(i) = \begin{cases} 1 & \text{if } \lambda(i) = \lambda(k) \\ 0 & \text{otherwise} \end{cases}$$

where: coef(i) represents the filter coefficient.

Figure 13:
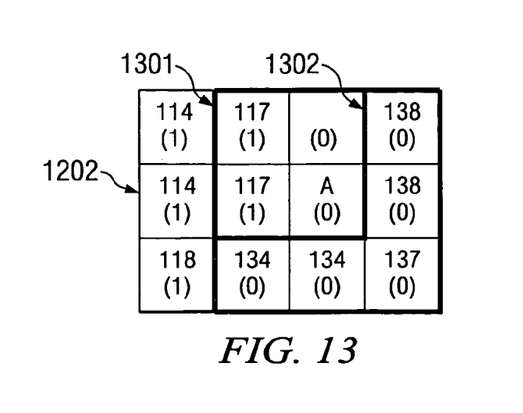
FIG. 13 illustrates a portion of the block in FIG. 12 highlighting the pixel to be interpolated in the following section in accordance with this invention.

FIG. 13 illustrates application of a 3-by-3 interpolation filter to calculate gray value of the pixels that have index opposite to the representative index. FIG. 13 is a portion of the example block extracted from FIG. 12. FIG. 13 illustrates: heterogeneous block 1201; the pixel 1301 under consideration, having the value "A" in FIG. 13; and a 3-by3 block 1302 centered around pixel 1301. In this example all the filter coefficients coef(i) are set to one. Equation (4) is rewritten as:

$$y_{up}(k) = \frac{138 + 138 + 134 + 134 + 137}{5} = 136 \quad (5)$$

The data points 138, 138, 134, 134 and 137 represent the pixel values of the surrounding eight pixels having the same binary index as pixel 1302 under consideration. Other missing pixels are similarly calculated.

Figure 14:
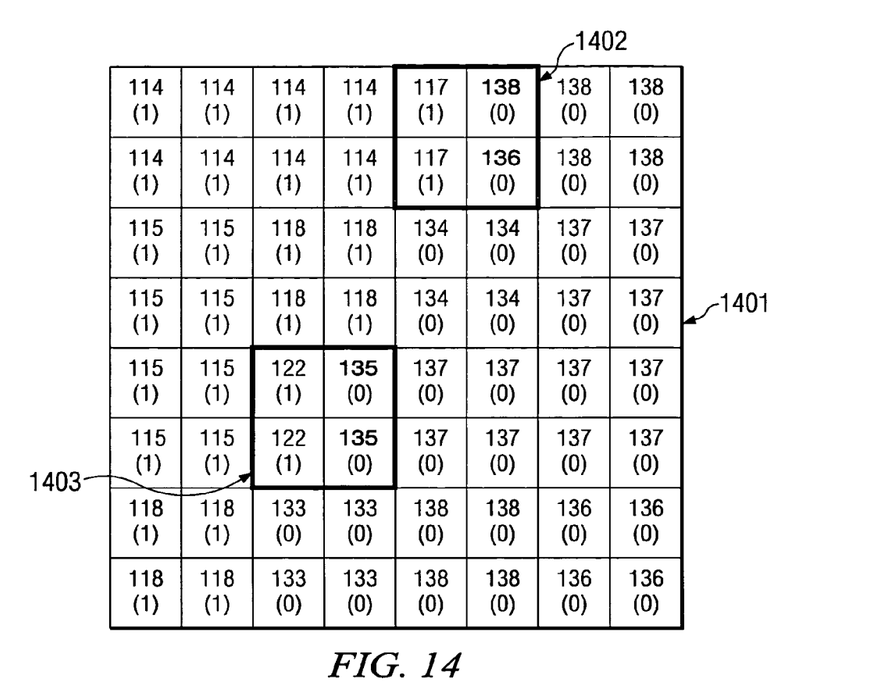
FIG. 14 illustrates the eventual chrominance values after interpolation.

There are cases where the Equation (4) can not be applied. If there is no pixel within the filter mask that has index identical to the center pixel the Equation (4) does not work. Such pixels must be handled specially. The filter mask size could be expanded, but this does prohibit the same problem. Alternatively, the binary index of the center pixel can be inverted and Equation (4) applied to the inverted value. FIG. 14 illustrates the results of this process. Note that some of the pixel values have been rounded assuming 8-bit integer.

Figure 15:
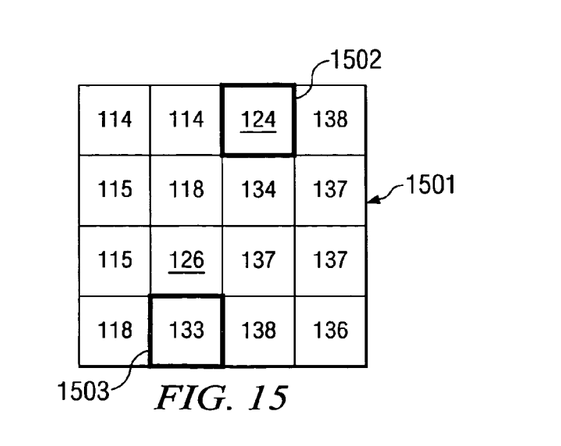
FIG. 15 illustrates the chrominance values subsampled by a linear down-sampling with the values that are different from this invention highlighted.

FIG. 15 illustrates the results of applying linear interpolation to original 4:4:4 format luminance data of the 8-by-8 block 811 illustrated in FIG. 8. The down-sampled 4-by-4 block 1501 includes pixels 1502 and 1503 formed from heterogeneous blocks. The linear down-sampling is regarded as a special case of the proposed scheme (i.e., all the indices are assumed to be identical). So the chrominance signals decimated by the linear scheme is given in FIG. 15.

Figure 16:
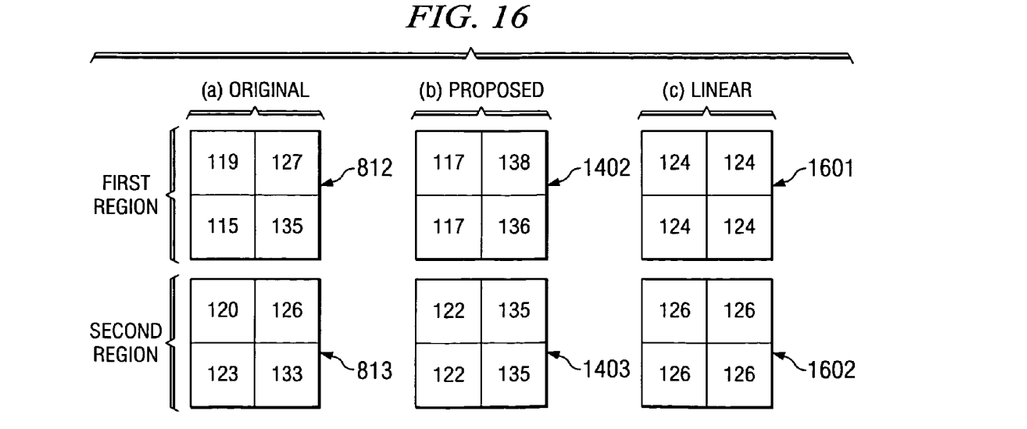
FIG. 16 illustrates a comparison between the original signals and the outputs of the invention and the linear down-sampling an up-sampling.

FIG. 16 illustrates a comparison between the original data of heterogeneous blocks 812 and 813, the results of this invention at blocks 1402 and 1402 and the results of a linear up-sampling process at blocks 1601 and 1602. The latter blocks 1601 and 1602 are formed by a simple sample-hold as illustrated in FIG. 11, where all four pixels in a 2-by-2 region have the same value. As mentioned earlier, the invention and the prior art linear techniques differ only at the heterogeneous blocks illustrated in FIG. 16.

Table 1 shows the absolute errors between the original signals and up-sampled pixels as distortion measure for comparison. Table 1 shows smaller errors for the inventive scheme than for the linear scheme. The linear scheme tends to smear edges while this invention tends to preserve them taking advantage of the inter-chrominance coherence property.

TABLE 1

|  | First region | Second region |
|---|---|---|
| Inventive Scheme | 16 | 14 |
| Linear scheme | 28 | 16 |

The errors are very much similar for the second region. However, the human eye will receive different idea from the signals. The invention provides a very sharp image whereas the linear method gives smeared edge. Most people prefer a sharper image to a smeared one.

This invention solves a problem that occurs through chrominance format conversion such as by down-sampling and up-sampling in color image/video coding. The invention generally outperforms the linear up-sampling method. The application of the invention is the joint pre- and post-processing in image coding such as JPEG, MPEG and H.26x. The only concern is that the luminance signals and hence the binary index will be affected in the compression process. At practical quality levels resulting in low to middle compression ratios, majority of index information will be left unchanged through the compression process.

As described earlier, it is theoretically impossible to capture three planes at the same instance and from the same angle even using high-end capturing device. It is likely that the color planes of the original image to be processed are not perfectly aligned. This invention requires good inter-chrominance coherence in the original image at the input of the encoder to obtain the better chrominance reproduction at decoder.

What is claimed is:

1. A method of chrominance down sampling comprising the steps of:

thresholding a corresponding luminance frame to generate a binary index frame wherein each pixel has a 0 if the corresponding luminance pixel is less than a predetermined luminance threshold and a 1 if the corresponding luminance pixel is greater than or equal to said predetermined luminance threshold;

applying a down-sampling filter to each filter window comprising a first block chrominance pixels to produce a second block of chrominance pixels, said second block being smaller than said first block, whereby if a binary index corresponding to a chrominance pixel of said first block is identical to a representative binary index of the filter window the chrominance pixel is input to the down-sampling filter, otherwise the chrominance pixel is not input to the down-sampling filter;

transmitting or storing said second block.

2. The method of claim 1, wherein:

said luminance frame is larger than said first block of chrominance pixels.

3. The method of claim 1, wherein:

said down-sampling filter forms the mean of all chrominance pixels of said first block having a binary index identical to a representative binary index of the filter window.

4. The method of claim 3, wherein:

said representative binary index of the filter window is a pixel in the upper left of the first block of chrominance pixels.

5. The method of claim 1, wherein:

said first block of chrominance pixels is a 2-by-2 block of chrominance pixels; and said second block of chrominance pixels is a single chrominance pixel.

6. The method of claim 1, wherein:

said first block of chrominance pixels is in a 4:4:4 image format; and said second block of chrominance pixels are in a 4:2:0 image format.

7. The method of claim 1, wherein:

said first block of chrominance pixels is in a 4:4:4 image format; and said second block of chrominance pixels are in a 4:2:2 image format.

8. The method of claim 1, wherein:

said first block of chrominance pixels is in a 4:2:2 image format; and said second block of chrominance pixels are in a 4:2:0 image format.

9. A method for chrominance misalignment correction upon chrominance up sampling comprising the steps of:

thresholding a corresponding luminance flame to generate a binary index flame wherein each pixel has a 0 if the corresponding luminance pixel is less than a predetermined luminance threshold and a 1 if the corresponding luminance pixel is greater than or equal to said predetermined luminance threshold;

applying an up-sampling filter to each filter window comprising a first block chrominance pixels to produce a second block of chrominance pixels, said second block being larger than said first block, whereby if a binary index corresponding to a chrominance pixel of said first block is identical to a representative binary index of the filter window the chrominance pixel is input to the up-sampling filter, otherwise the chrominance pixel is not input to the up-sampling filter; and displaying or printing said second block.

10. The method of claim 9, wherein:

said luminance frame is larger than said second block of chrominance pixels.

11. The method of claim 9, wherein:

said up-sampling filter operates to for each pixel of said second block of chrominance pixels having a binary index identical to the representative binary index of the filter window, placing the chrominance pixel value of the representative binary index of the filter window pixel, and for each pixel of the second block of chrominance pixels where the corresponding binary index is opposite the representative binary index of the filter window, placing the average of the chrominance of each of the eight surrounding pixels in the second block of chrominance pixels having the opposite binary index.

12. The method of claim 11, wherein:

said representative binary index of the filter window is a pixel in the upper left of the second block of chrominance pixels.

13. The method of claim 9, wherein:

said first block of chrominance pixels is a single pixel; and said second block of chrominance pixels is a 2-by-2 block of chrominance pixels.

14. The method of claim 9, wherein:

said first block of chrominance pixels is in a 4:2:0 image format; and said second block of chrominance pixels are in a 4:4:4 image format.

15. The method of claim 9, wherein:

said first block of chrominance pixels is in a 4:2:0 image format; and said second block of chrominance pixels are in a 4:2:2 image format.

16. The method of claim 9, wherein:

said first block of chrominance pixels is in a 4:2:2 image format; and said second block of chrominance pixels are in a 4:4:4 image format.

* * * * *